3,697,252
PHYTOTOXICANT
Paul J. Stoffel, Creve Coeur, and David J. Beaver, Richmond Heights, Mo., assignors to Monsanto Company, St. Louis, Mo.
No Drawing. Filed Dec. 8, 1969, Ser. No. 883,297
Int. Cl. A01n 9/22
U.S. Cl. 71—95                                             6 Claims

ABSTRACT OF THE DISCLOSURE

It has been found that N-(3,4 - dichlorocarbanilino) succinimide is useful as a phytotoxicant in the control of noxious plant life.

This invention relates to the phytotoxicant usage of N-(3,4-dichlorocarbanilino) succinimide,

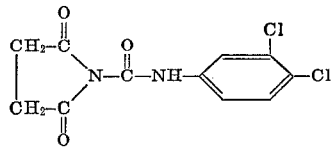

a white solid melting at 147.8–148.5° C. It is readily prepared by refluxing a substantially equimolecular mixture of succinimide and 3,4-dichlorophenylisocyanate in o-dichlorobenzene and thereafter isolating the addition product by conventional means.

The phytotoxicant of this invention is useful both as a pre-emergent and contact or post-emergent phytocide for noxious plant life, and particularly as a contact or post-emergent specific phytocide for growing broadleaf noxious or weed infestations in growing grass.

In order to illustrate this invention the following imides were prepared:

Compound B: N-(4 - chlorocarbanilino) succinimide, white solid melting at 187.3–188.0° C.;
Compound C: N - (3 - chlorocarbanilino) succinimide, buff colored solid melting at 119.7–120.5° C.;
Compound D: N - (3,4 - dichlorocarbanilino) maleimide, white solid melting at 164–165° C.;
Compound E: N - (carbamyl) succinimide (U.S. 2,788,349); and
Compound F: N - (3 - chlorocarbanilino) pyrrolidine-2-one, white solid melting at 135.7–136.6° C.; and
Compound G: N - (3,6 - dichlorocarbanilino) pyrrolidine-2-one, white solid melting at 138.7–139.4° C.

As illustrative of the contact or post-emergent phytotoxicity of the phytotoxicant of this invenion, which is identified as Compound A hereinafter, as compared to aforedescribed Compounds B, C, D, E, F and G is the following:

(1) Respective Compounds B, C, D, E, F and G were applied at a rate of 10 pounds thereof per acre in the form of an 0.5 percent by weight thereof aqueous spray to six separate plots respectively having 21 day established growth of morning glory, wild oat, brome grass, rye grass, radish, sugar beet, foxtail, crabgrass, pigweed, soybean, wild buckwheat, tomato and sorghum. An inspection of the respective plots conducted fourteen (14) days immediately after the respective spray applications revealed no evidence of phytotoxicity to any of the said 13 species of plants. In contrast Compound A applied at a rate of 4 pounds thereof per acre in the form of an 0.2% by weight thereof aqueous spray to a separate plot having the same aforesaid 21 day established growth species mixture of 13 grasses and broadleafs, revealed upon inspecting the plot fourteen (14) days immediately after the spray application that the radish, sugar beet, foxtail, crabgrass, pigweed and wild buckwheat plants were killed completely while the morning glory, soybean and tomato plants exhibited severe phytotoxicity and while the wild oat, brome grass, rye grass and sorghum plants exhibited no evidence of phytotoxicity. In further contrast Compound A when applied at a rate of 10 pounds thereof per acre in the form of an 0.5 percent by weight thereof aqueous spray to a separate plot having the same aforesaid 21 day established growth species mixture of 13 grasses and broadleafs revealed upon inspecting the plot fourteen (14) days immediately after the spray application that the grass species wild oat, brome grass, rye grass and sorghum exhibited moderate phytotoxicity while the crabgrass and foxtail grass species and all seven of the broadleaf species exhibited severe phytotoxicity to complete kills. As is evident in addition to growing broadleaf specificity, the phytotoxicant of this invention is also post-emergent or contact phytotoxicantly specific toward crabgrass and foxtail yet leaves unharmed the more desirable growing grass species such as sorghum by observing controlled rates of application:

As illustrative of the pre-emergent phytotoxicity of the phytotoxicant of this invention, which is identified as Compound A hereinafter, as compared to aforedescribed Compounds B, D, E, F and G is the following:

(2) Respective Compounds A, B, D, E, F and G were evenly sprayed in the form of aqueous emulsions thereof at a rate of 25 pounds of the compound per acre to the soil surface of separate plots of a good grade of agricultural top soil seeded with morning glory, wild oat, brome grass, rye grass, radish, sugar beet, foxtail, crabgrass, pigweed, soybean, wild buckwheat, tomato and sorghum. Fourteen(14) days immediately after the spray application in the greenhouse under ordinary conditions of sunlight and watering no growth inhibiting suppression of any one of either of said grass of broadleaf plant species was observed in the respective plots sprayed with aqueous emulsions of respective Compounds B, D, E, F and G. In contrast thereto the plot sprayed with the aqueous emulsion of Compound A displayed very pronounced to severe suppression of the growth of brome grass, rye grass, radish, sugar beet, foxtail, crabgrass, pigweed, wild buckwheat and tomato, while slight to moderate suppression of the growth of wild oat, sorghum and morning glory was observed, and while no suppression of the growth of soybean was osberved. In further contrast Compound A at a rate of 5 pounds thereof per acre sprayed as an aqueous emulsion thereof to the soil surface of a separate plot of a good grade of agricultural top soil seeded with the same aforesaid mixture of 13 grasses and broadleaf species revealed upon taking an inspection fourteen (14) days immediately after the spray application in the greenhouse under ordinary conditions of sunlight and watering that very pronounced to severe suppression of the growth of brome grass, sugar beet, crabgrass, pigweed, wild buckwheat and tomato occurred, while slight to moderate suppression of the growth of morning glory, rye grass, radish, foxtail and sorghum was observed, and while no suppression of the growth of soybean or wild oat was observed. As is evident the phytotoxicant of this invention is pre-emergent phytotoxicantly selective to noxious plant life in soybean planted fields.

From the foregoing evaluation data it is apparent that the compound of this invention is an effective phytotoxicide particularly as a post-emergent or contact phytotoxicide. Valuable selective post-emergent broadleaf phytotoxicidal effects will be observed by applications of small amounts, for example, as low as 0.1 lb. of the compound of this invention per acre as well as higher concentrations, for example, up to 15 lbs. per acre. The preferred range of application for post-emergent specificity in growing sorghum is from about 1 to about 10 lbs. per acre. For general application and phytotoxicidal effect on both grasses and broad leaf plants in either the pre-emergent or post-emergent larger amounts, e.g. from about 15 to about 30 lbs. per acre, will be found necessary.

It will be apparent that quite different effects can be obtained by modifying the method of use. For this reason an essential part of this invention is the formulation so as to permit a uniform predetermined application of phytotoxicide to growing plants or soil or other growth media so as to produce the desired effect. By proper selection and proportioning of the various conditioning agents either liquid or solid formulations can be prepared, and so as to adapt the phytotoxicide for achieving the desired result with any conventional device for treating growing plants or the surface or sub-surface of the soil or other growth media.

Although the compound of this invention is useful per se in controlling a wide variety of plant growth in the pre-emergent or post-emergent state, it is preferable that it be supplied to the plant growing medium or growing plan in a dispersed form in a suitable extending agent.

In the instant specification and appended claims it is to be understood that the term "dispersed" is used in its widest possible sense. When it is said that the compound of this invention is dispersed, it means that particles of the compound of this invention may be molecular in size and held in true solution in a suitable organic solvent. It means further that the particles may be colloidal in size and held in true solution in a suitable organic solvent. It means further that the particles may be colloidal in size and distributed throughout a liquid phase in the form of suspensions or emulsions or in the form of particles held in suspension by a wetting agent. The term "dispersed" also means that the particles can be mixed with and distributed throughout a solid carrier providing a mixture in particulate form, e.g. pellets, granules, powders, or dusts.

In the instant specification and appended claims it is to be understood that the expression "extending agent" includes any and all of those substances in which the compound of this invention is dispersed. It includes therefore, the solvents of a true solution, the liquid phase of suspensions, or emulsions and the solid phase of particulate solids, e.g. pellets, granules, dusts and powders.

The exact concentration of the compound of this invention employed in combatting or controlling various vegetation can vary considerably provided the required dosage (i.e. phytotoxic amount) thereof is supplied to the growing plant or plant growing medium. From a practical point of view, the manufacturer must supply the agriculturist with a low-cost concentrate or spray base or particulate solid base in such form that, by merely mixing with water or solid extender (e.g. powdered clay or talc) or other low-cost material available to the agriculturist at the point of use, he will have an easily prepared phytotoxicidal spray or particulate solid. In such a concentrate composition, the compound of this invention generally will be present in a concentration of 5 to 95 percent by weight, the residue being any one or more of the well-known phytotoxicidal adjuvants, such as the various surface active agents (e.g. detergents, a soap or other emulsifying or wetting agent), surface active clays, solvents, diluents, carrier media, adhesives, spreading agents, humectants, and the like.

There are a large number of organic liquids which can be used for the preparation of solutions, suspensions or emulsions of the compound of this invention. For example, isopropyl ether, acetone, methyl ethyl ketone, dioxane, cyclohexanone, carbon tetrachloride, ethylene dichloride tetrachloroethane, hexane, heptane and the like higher liquid alkanes, hydrogenated naphthalenes, solvent naphtha, benzene, toluene, xylene, petroleum fractions (e.g. those boiling almost entirely under 400° F. and having a flash point above about 80° F., particularly kerosene), mineral oils and the like.

The compound of this invention is preferably applied to growing plants or the plant growing medium in the form of emulsions or suspensions. Emulsions or suspensions are prepared by dispersing the compound of this invention either per se or in the form of an organic solution thereof in water with the aid of a water-soluble surfactant. The term "surfactant" as employed here in the appended claims is used as in volume II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and spreading agents" that are adapted to be admixed with the compound of this invention in order to secure better wetting and spreading of the active ingredient in the water vehicle or carrier in which it is insoluble through lowering the surface tension of the water (see also Frear 'Chemistry of Insecticides, Fungicides and Herbicides," Second edition, 1948, page 280). These surfactants include the well-known capillary active substances which may be anion-active (or anionic) or non-ionizing (or non-ionic) which are described in detail in Volume I and II of Schwartz, Perry and Berch's "Surface Active Agents and Detergents," (1958, Interscience Publishers, Inc., New York) and also in the November 1947 issue of Chemical Industries (pages 811–824) in an article entitled "Synthetic Detergents" by John W. McCutcheon and also in the July, August, September, and October 1952 issues of Soap and Sanitary Chemicals under the title "Synthetic Detergents." The disclosures of these articles with respect to surfactants, i.e. the anion-active, and non-ionizing capillary active substances, are incorporated in this specification by reference in order to avoid unnecessary enlargement of this specification. The preferred surfactants are the water-soluble non-ionic surface-active agents set forth in U.S. 2,846,398 (issued Aug. 5, 1958).

The compound of this invention can be dispersed by suitable methods (e.g. tumbling or grinding) in solid extending agents either of organic or inorganic nature and applied to growing plants or plant growing medium in particulate form. Such solid materials include for example, tricalcium phosphate, calcium carbonate, kaoline, bole, kieselguhr, talc, bentonite, fuller's earth, pyrophillite, diatomaceous earth, calcined magnesia, volcanic ash, sulfur and the like inorganic solid materials and include for example, such materials of organic nature as powdered cork, powdered wood, and powdered walnut shells. The preferred solid carriers are the adsorbent clays, e.g. attapulgus clay. These mixtures can be used for phytotoxicidal purposes in the dry form or by addition of water-soluble surfactants or wetting agents the dry particulate solids can be rendered wettable by water so as to obtain aqueous dispersions or suspensions suitable for use as sprays.

In all of the forms described above the dispersions can be provided ready for use in combatting noxious vegetation or they can be provided in a concentrated form suitable for mixing with or dispersing in other extending agents. As illustrative of a particularly useful concentrate is an intimate mixture of the compound of this invention with a water-soluble surfactant of anionic or non-ionic nature or mixtures thereof which lowers the surface tension of water in the weight proportions of 0.1 to 15 parts of said surfactant with sufficient of a compound of this invention to make 100 parts by weight. Such a concentrate is particularly adapted to be made into a spray for combatting various forms of noxious vegetation by the addition of water thereto. As illustrative of such a concentrate is an intimate mixture of 95 parts by weight of N-(3,4-dichlorocarbanilino) succinimide and 5 parts by weight of a water-soluble non-ionic surfactant such as polyoxyethylene derivative of sorbitan monolaurate.

Another useful concentrate adapted to be made into a spray for combatting noxious vegetation is a solution (preferably as concentrated as possible) of the compound of this invention in an organic solvent therefor. The said liquid concentrate preferably contains dissolved therein a minor amount (e.g. 0.5 to 10 percent by weight of the weight of the new phytotoxicidal agent) of a non-ionic surfactant (or emulsifying agent), which non-ionic surfactant is water-soluble. As illustrative of such a concentrate is a solution of N-(3,4-dichlorocarbanilino) succinimide in acetone which solution contains dissolved therein a water-soluble polyoxyethylene non-ionic surfactant.

Of the surfactants aforementioned in preparing the various emulsifiable, wettable or dispersible compositions or concentrates of this invention, the non-ionic surfactants are preferred. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of sorbitan respectively containing 15 to 30 moles of ethylene oxide per mole of sorbitan mono-ester or alkylphenol.

The phytotoxicant of this invention can also be advantageously employed in combination with other pesticides, including, for example, fungicides, nematocides, bactericides, insecticides and other phytotoxicants. In this manner it is possible to obtain mixtures which are effective against a wide variety of pests and other forms of noxious life.

While this invention has been described with respect to certain embodiments, it is to be understood that it is not so limited and that variations and modifications thereof obvious to those skilled in the art can be made without departing from the spirit and scope thereof.

The embodiments of the invention in which an exclusive property or privilege is claimed are identified as follows:

1. A method for controlling growing noxious plant life which comprises applying directly thereto a phytotoxic amount of N-(3,4-dichlorocarbanilino) succinimide.

2. A method for selectively controlling growing noxious broadleaf infestations in growing grass which comprises applying a phytotoxic amount of N-(3,4-dichlorocarbanilino) succinimide directly to the growing broadleaf weeds.

3. The method of claim 2 wherein the growing grass is sorghum.

4. A method of pre-emergently inhibiting the growth of noxious plants which comprises treating the plant growing medium with a quantity of N-(3,4-dichlorocarbanilino) succinimide sufficient to inhibit the pre-emergent growth of plants contained in the plant growing medium.

5. The method of claim 4 wherein the plant growing medium is planted to soybean.

6. The method of claim 2 wherein the succinimide is applied at a rate of from about 0.1 to about 15 pounds per acre.

References Cited
UNITED STATES PATENTS

| | | | |
|---|---|---|---|
| 2,829,146 | 4/1958 | Beaver et al. | 71—95 X |
| 3,541,111 | 11/1970 | Genike | 71—95 X |

JAMES O. THOMAS, Jr., Primary Examiner

U.S. Cl. X.R.

260—326.3